United States Patent

[11] 3,583,300

| [72] | Inventors | Bruce K. Johnson<br>Andover;<br>Philip G. Baker, Norwood, both of, Mass. |
|---|---|---|
| [21] | Appl. No. | 717,813 |
| [22] | Filed | Apr. 1, 1968 |
| [45] | Patented | June 8, 1971 |
| [73] | Assignee | Polaroid Corporation<br>Cambridge, Mass. |

[54] PHOTOGRAPHIC CAMERA WITH VIEWFINDER
8 Claims, 3 Drawing Figs.

[52] U.S. Cl. .................................................. 95/11,
88/1.5, 350/110
[51] Int. Cl. ................................................. G03b 17/20
[50] Field of Search .......................................... 95/11, 11
(Viewers), 42, 44; 88/1.5; 350/110, 114

[56] References Cited
UNITED STATES PATENTS

| 2,936,689 | 5/1960 | Kirchhoff ..................... | 95/44 |
| 3,006,262 | 10/1961 | MacMillin ..................... | 95/44 |
| 3,326,104 | 6/1967 | Mische ......................... | 95/11 |

FOREIGN PATENTS

| 361,976 | 6/1962 | Switzerland ................. | 95/11 |

Primary Examiner—Samuel S. Matthews
Assistant Examiner—Fred L. Braun
Attorneys—Brown and Mikulka, William D. Roberson and Leonard S. Selman ABSTRACT: A photographic camera having a viewfinder and a related periscopelike system whereby certain indicia on the lens housing may be seen by the user through the viewfinder as he views the scene to be photographed.

PATENTED JUN 8 1971

INVENTORS
Philip T. Baker
and
Bruce R. Johnson
BY
Brown and Mikulka
and
Leonard S. Selman
ATTORNEYS

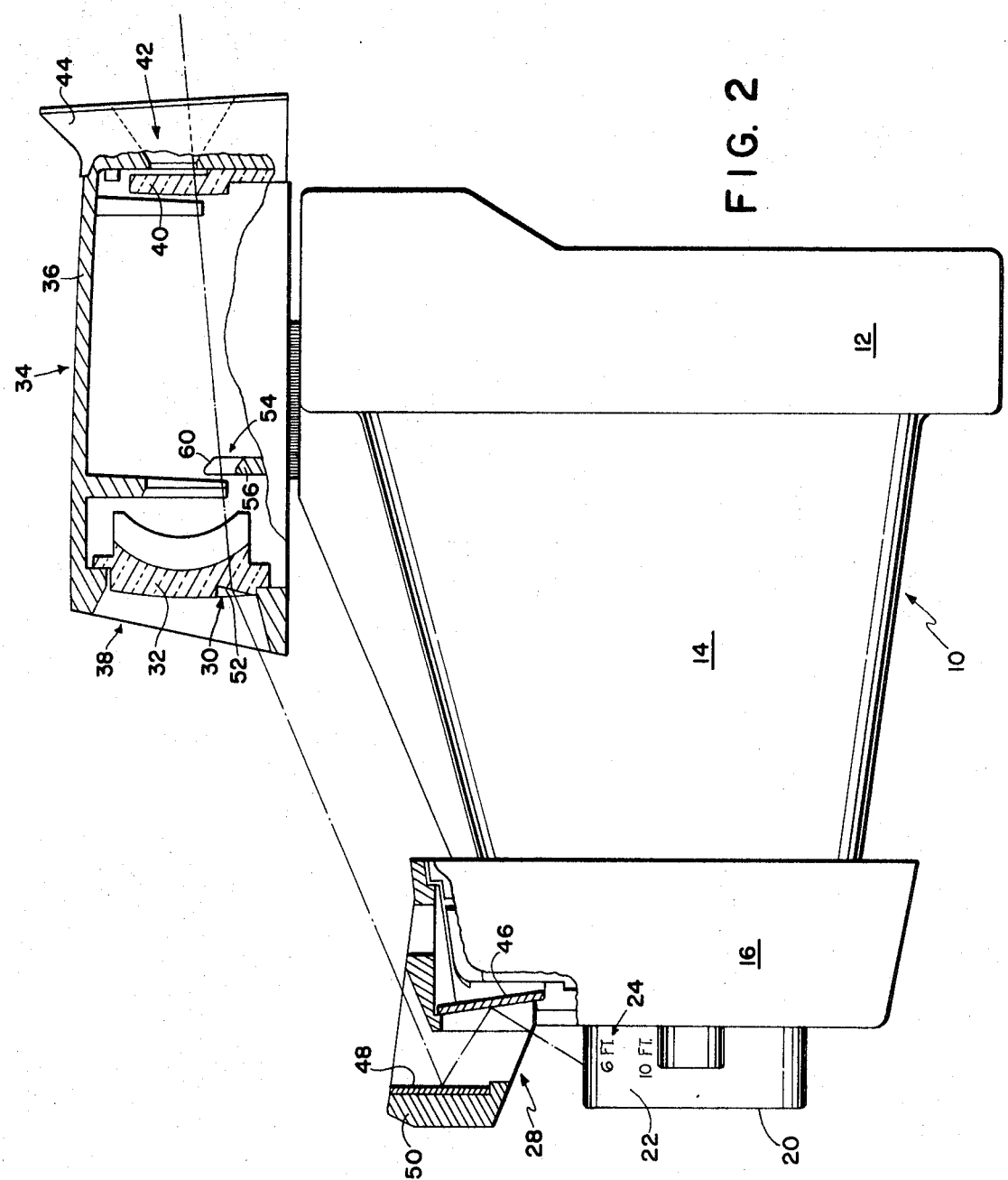

PHOTOGRAPHIC CAMERA WITH VIEWFINDER

BACKGROUND AND SUMMARY OF THE INVENTION

In the past, cameras have been proposed with means to provide an image through the viewfinder window of certain indicia such as shutter speeds, diaphragm settings, etc. Many of these cameras have utilized a considerable number of expensive optical elements to accomplish this purpose, all of which must be precisely positioned. It is therefore desirable to simplify such indicia-imaging means, especially if they are to be incorporated in relatively inexpensive cameras.

The present invention may be embodied in a camera which has a viewfinder of the type which has a front window through which light enters the viewfinder and a rear window through which the user views the scene to be photographed. The viewfinder may be mounted on the top of the camera above and displaced a substantial distance from the lens and surrounding lens bezel at the end of an enclosed light path between the lens and the film plane. In this embodiment, the lens bezel has certain markings thereon, in particular a distance scale, which scale is movable with respect to an index position as the lens is focused. It is the aim of this invention to present an image of the scale on the lens bezel in or beside the field of view of the viewfinder. This will serve as a reminder to the user of the distance at which the lens is focused. If the setting is obviously in error, this will be obvious to the operator and the proper correction can be made before the camera shutter is released.

To accomplish this purpose, due to the displacement of the viewfinder from the lens bezel, there is provided a periscopelike system including two reflectors to direct the scale image through a path to a scale image refracting portion comprising a surface which is uniquely formed on the front surface of one of the lens elements of the viewfinder. Thus, a single lens element, which may be molded without difficulty, provides both an image of the scene which one may observe in the viewfinder window and a refracting portion on the same lens projects the reflected image of the lens bezel scale so that the user sees an image of the scale beside or in the scene image. The two reflectors comprise a first mirror surface positioned in the lens housing above the scale and facing forward and a second mirror surface slightly above and in front of the first mirror surface and facing backward to direct the scale image toward the scale image refracting portion on the viewfinder lens. While the first mirror surface reverses the scale image, the second mirror surface has the effect of reversing the first mirror image to present a properly oriented scale image in the viewfinder window. The scale image refracting portion on the front of said viewfinder lens consists of a prismatic portion with a toroidal-shaped surface which is effective to prevent astigmatism of the scale image as it is directed toward the rear viewfinder window.

Accordingly, it is an object of this invention to provide a photographic camera having a viewfinder through which the user may view the scene to be photographed and means cooperating with said viewfinder to image certain scale means beside or in the scene image.

It is a further object of this invention to provide reflecting means whereby a reflected image of a scale on the lens bezel surface is directed toward a prismatic refracting portion on the viewfinder lens which directs the image of said scale so that it appears beside or in the scene image.

It is another object of this invention to provide the prismatic refracting portion on the viewfinder lens with a surface which prevents astigmatism of the scale image.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

BRIEF DESCRIPTION OF THE DRAWINGS

FIG. 2 is partly cross-sectional view taken along line 2-2 of FIG. 1 showing the internal details of the photographic camera including the viewfinder and the scale imaging apparatus.

DESCRIPTION OF THE PREFERRED EMBODIMENT

Figure 1:
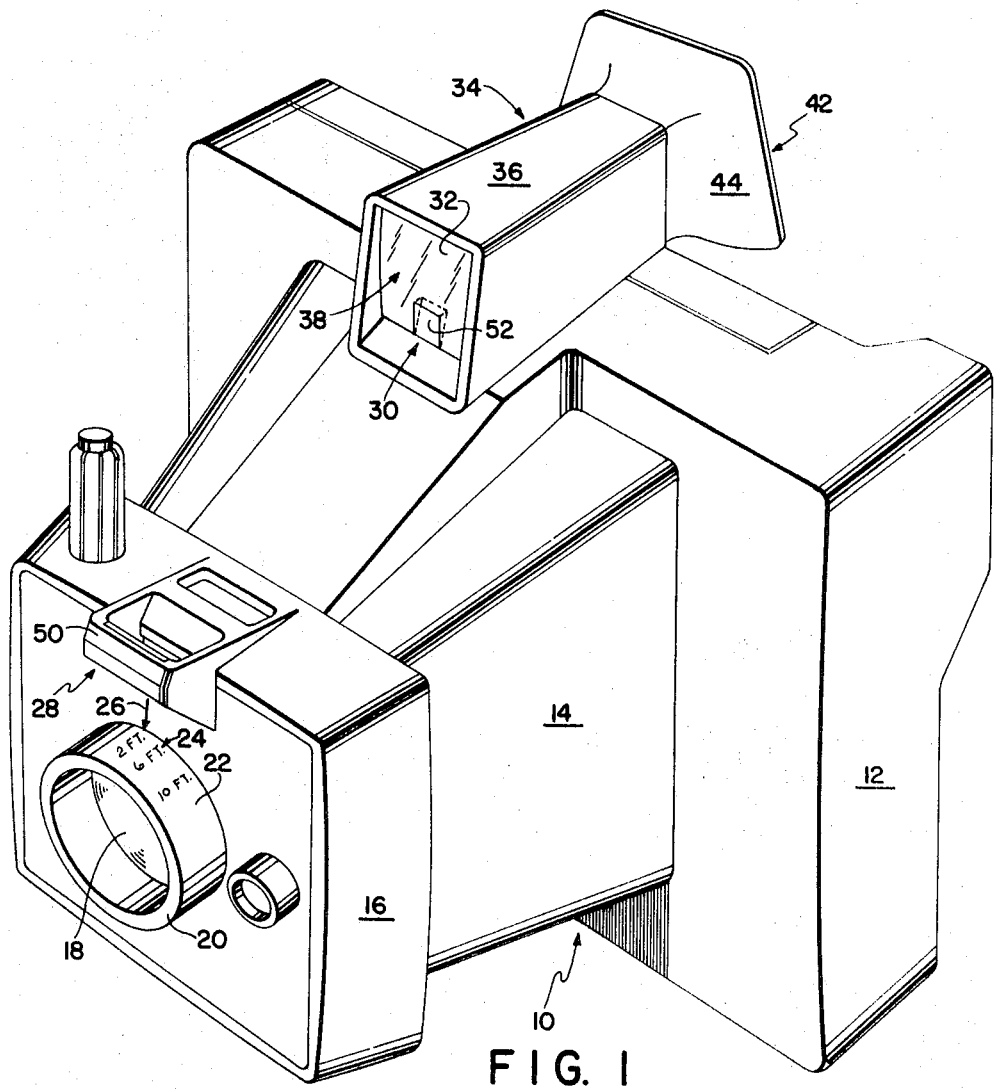
FIG. 1 is a perspective view of a photographic camera embodying the present invention showing the scale on the lens bezel surface, the scale reflecting means and the viewfinder lens with the prismatic refracting portion formed on the front surface thereof.

Referring to FIG. 1, there is illustrated a photographic camera having a molded plastic housing 10 including a film chamber 12 and a protected light path 14 between the film chamber and the lens housing 16. Located in the lens housing is a lens 18 mounted in a ring-shaped element 20 having a cylindrical bezel surface 22. Scale means 24 are located on said bezel surface and the lens is focused by manually turning said element 20 until the selected scale marking is opposite index mark 26 above the bezel surface on the lens housing. Also located above the bezel surface is a reflecting means 28 which reflects an image of the lens bezel to a prismatic refracting portion 30 located on the front of the viewfinder lens 32.

As shown in FIG. 2, a viewfinder assembly 34 is mounted upon the upper portion of the plastic camera housing 10. The viewfinder assembly 34 includes an enclosed tubular body portion 36 and the negative viewfinder lens 32 in the front window 38 thereof and a positive eye lens 40 in the rear window 42. A flexible rubber light shield 44 is attached upon a rearmost end of the viewfinder body.

Figure 3:
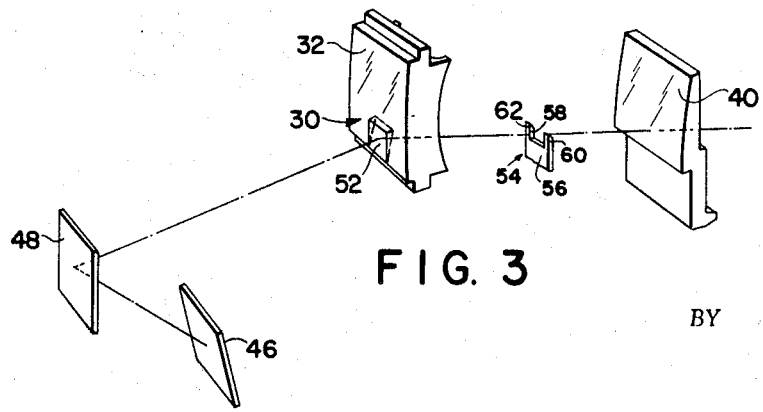
FIG. 3 is a perspective view of the optical elements comprising the optical apparatus of the invention, the elements being isolated from the camera for the sake of clarity.

The optical elements shown in FIG. 3 and in cross section in FIG. 2 include the reflecting means 28 mounted above the lens bezel surface 22. A first reflector 46 is mounted in the lens housing immediately above the bezel surface and facing forward and a second reflector 48 is mounted in an extension 50 of the lens housing in position to receive a reflected image of the scale from the first reflector and direct the reflected image backwards toward the prismatic refracting portion 30 on viewfinder lens 32.

The scale refracting portion on the viewfinder lens 32 comprises a prismatic portion 30 molded in the front surface of said lens. The prismatic portion has an aspheric surface 52 which is actually toroidal. This surface is designed to receive the reflected image of the scale means and redirect it toward the eye lens 40 without suffering astigmatism which might otherwise be expected.

In order to more clearly define and outline the scale image at the bottom of the scene image as seen by the user, framing means 54 as shown in FIGS. 2 and 3 are provided. The framing means consist of a plastic molded extension 56 extending upward from the camera housing into the space enclosed by the viewfinder body portion 36. Extending into the image path, an opening 58 allows the scale image to pass through to the eye lens while a pair of side framing portions 60 and 62 provide a clearly defined frame for said scale image as seen through the viewfinder windows.

While the scale means is shown in the preferred embodiment as a distance scale related to the distance at which the lens is focused at, it is also apparent that the scale may indicate other settings of the lens such as a series of f stops indicating the diaphragm opening at which the lens is set.

Since certain changes may be made in the above apparatus without departing from he scope of the invention herein involved, it is intended that all matter contained in the above description or shown in the accompanying drawings shall be interpreted as illustrative and not in a limiting sense.

We claim:

1. A photographic camera comprising:

a camera body including a film chamber and a lens housing on the front of said camera body;

a lens mounted on said lens housing;

indicia having a site on said lens housing, said indicia indicating a setting of said lens;

a viewfinder, having a line of sight, mounted on said camera body, rearwardly of said lens housing, and having a viewfinder lens at the front end of an enclosed chamber and an eye lens at the rear of said chamber;

reflecting means mounted on said lens housing and positioned forwardly thereof, spaced substantially apart from said viewfinder and below said viewfinder's line of sight, for reflecting an image of said indicia rearwardly along a path proximate an exterior surface of said camera body toward said viewfinder; and a prismatic refracting portion on the front surface of said viewfinder lens, said portion receiving the reflected image of said indicia and directing said image to said eye lens so that one looking through said eye lens observes the image of the scene to be photographed as formed by said viewfinder lens and at the bottom of said scene an image of said indicia.

2. The photographic camera of claim 1 wherein said reflecting means comprise first and second reflectors, said first reflector being mounted above said indicia on said lens housing for reflecting an image of said indicia to said second reflector which reflects said image toward said prismatic refracting portion on the front of said viewfinder lens.

3. The photographic camera of claim 2 wherein said second reflector is mounted above and in front of said first reflector means in a projecting portion of said lens housing which is positioned directly above said indicia.

4. The photographic camera of claim 3 wherein said first reflector faces forward and the second reflector faces toward the back of the camera for directing the reflected indicia image backward toward said prismatic refracting portion on said viewfinder lens.

5. A photographic camera comprising:

a camera body including a film chamber and a lens housing on the front of said camera body;

a lens mounted on said lens housing, said lens being mounted in a ring-shaped element surrounding said lens and having a cylindrical bezel surface upon which indicia are located, said bezel surface being rotated to focus said lens;

a viewfinder having a line of sight mounted on said camera body rearwardly of said lens housing having a viewfinder lens at the front end of an enclosed chamber and an eye lens at the rear of said chamber;

reflecting means mounted on said lens housing and positioned forwardly thereof, spaced substantially apart from said viewfinder and below said viewfinder's line of sight, for reflecting an image of said indicia on said bezel surface toward said viewfinder, said reflecting means including first and second reflectors, said first reflector positioned above said indicia facing forwardly for receiving said indicia image and reflecting it to said second reflector, facing rearward positioned above and forward of said first reflector, for receiving said indicia image from said first reflector and reflecting said indicia image toward said viewfinder lens; and a prismatic refracting portion of said viewfinder lens, said portion receiving the reflected image of said indicia on said bezel surface and directing said image to said eye lens so that one looking through said eye lens observes the image of the scene to be photographed as formed by said viewfinder lens and at the bottom of said scene an image of said indicia on said bezel surface.

6. A photographic camera comprising:

a camera body including a film chamber and a lens housing on the front of said camera body;

a lens mounted on said lens housing, said lens being mounted in a ring-shaped element surrounding said lens and having a cylindrical bezel surface upon which distance indicia are located, said bezel surface being rotated to focus said lens;

reflecting means, mounted on said lens housing and positioned forwardly thereof, for forming a reflected image of said indicia on said bezel surface, said reflecting means comprising a pair of reflectors positioned above said bezel surface a first of said reflectors facing forwardly for receiving said indicia image and reflecting said indicia image to the second of said reflectors positioned above and forward of said first reflector, said second reflector facing rearwardly for reflecting said indicia image along a path proximate an exterior surface of said camera body;

a viewfinder, mounted on top of said camera body rearwardly of said lens housing, its line of sight being above said reflecting means, and having a negative viewfinder lens at the front end of an enclosed chamber and a positive eye lens at the rear of said chamber;

a prismatic refracting portion on the front surface of said viewfinder lens and formed integral therewith, said portion receiving said reflected image of said indicia on said bezel surface and directing said image to said eye lens so that one looking through said eye lens will observe the image of the scene to be photographed as formed by said viewfinder lens at the bottom of said scene an image of said indicia on said bezel surface; and framing means located between said viewfinder lens and said eye lens in the path of said indicia image and providing a framed image of said indicia as observed by the user.

7. The photographic camera of claim 6 wherein said framing means include a pair of side framing portions extending into said indicia image path and having an opening therebetween through which the central portion of the indicia image may pass.

8. A photographic camera comprising:

a camera body including a film chamber and a lens housing on the front of said camera body;

a lens mounted on said housing;

indicia on said lens housing, for indicating a setting of said lens;

a viewfinder having a line of sight mounted on said camera body, rearwardly of said lens housing, wherein said viewfinder has a viewfinder lens at the front end of an enclosed chamber and an eye lens at the rear of said chamber, said viewfinder lens having a prismatic refracting portion on the front surface thereof; and reflecting means, mounted on said lens housing below said line of sight, including first and second reflectors, said first reflector positioned above said indicia and facing toward the front of said camera and reflecting an image of said indicia to said second reflector positioned above and slightly forward of said first reflector, said second reflector facing toward the back of said camera and directing said indicia image backward along a path proximate said camera body to said prismatic portion on said viewfinder lens which directs said indicia image to said eye lens so that one looking through said eye lens observes the image of the scene to be photographed as formed by said viewfinder lens and at the bottom of said scene an image of said indicia.